United States Patent Office 3,084,146
Patented Apr. 2, 1963

3,084,146
AROMATICALLY UNSATURATED COMPOUNDS
AND PREPARATION THEREOF
Louis A. Errede, Westfield, N.J., assignor, by mesne assignments, to Minnesota Mining and Manufacturing Company, St. Paul, Minn., a corporation of Delaware
No Drawing. Filed Apr. 24, 1957, Ser. No. 654,655
20 Claims. (Cl. 260—88.3)

This invention relates to a novel and useful polymer of improved properties and to the method for the preparation thereof. In one aspect this invention relates to a novel and improved process for polymerizing a quinodimethane. In another aspect this invention relates to polymers of quinodimethanes having aromatic nuclei, which polymers have improved molding properties. In still another aspect this invention relates to a process for the production of moldable polymers of quinodimethane.

It is known that certain polymers which contain aromatically unsaturated cyclic nuclei such as poly-p-xylylene have desirable properties which make them valuable as electrical insulators and as protective coatings which have high heat stability and extraordinary resistance to various corrosive liquids. These polymers also have excellent impermeability to common organic solvents and chemical reagents. However, in spite of these desirable characteristics, such polymers have been confined to somewhat limited application as a result of certain less desirable properties, such as, their non-flexibility, their high degree of insolubility in organic solvents and their lack of molding properties. Various attempts have been made to mold the polymer at temperatures ranging between about 350° C. and about 450° C., but even at these elevated temperatures the molded samples have been brittle and extremely discolored, thus diminishing their use as molded products.

The polymerization of quinodimethane has previously been carried out in such a way that polymerization occurred at the moment of condensation. Under these conditions, the reaction can not be controlled to yield polymer of productible composition and molecular weight. The polymers produced at the moment of condensation on a cold solid surface are relatively unmoldable and brittle.

It is, therefore, an object of the present invention to provide a new and valuable process for the preparation of aromatic unsaturated compounds having improved molding properties.

Another object of this invention is to provide a method for producing improved aromatically unsaturated compounds of reproducible composition and molecular weight.

Another object of this invention is to provide a process for the preparation of valuable compounds containing aromatically unsaturated cyclic nuclei in high yields, which compounds can be molded into a variety of useful articles at relatively low temperatures.

Another object is to provide a moldable homopolymer of quinodimethane.

Another object is to provide a moldable copolymer of quinodimethane.

Various other objects and advantages of the present invention will become apparent to those skilled in the art from the accompanying description and disclosure.

According to this invention a polymerization reaction is effected under isothermally controlled conditions at a temperature between about −150° C. and about −45° C. with an alicyclic compound containing a quinoid ring to which two aliphatic diradicals are each doubly bonded to produce a moldable aromatically unsaturated polymer of said alicyclic compound. Examples of alicyclic compounds or quinodimethanes which are polymerized as described herein are the para-quinodimethanes comprising 1,4-quinodimethane, 1,4-naphthaquinodimethane and corresponding heteronitrogen-containing para-quinodimethanes and the nuclear substitution products of the foregoing members with atoms of normally gaseous halogen atoms with methyl and with halomethyl radicals. The process of this invention is effected by reacting a quinodimethane in solution in a suitable solvent for example, hexane at a temperature between about −150° C. and about −45° C. The polymerization product thereby produced is a thermoplastic which contains a plurality of xylylene units.

The quinodimethane used in accordance with this invention is an alicyclic compound containing a diunsaturated, six-membered ring having each of two carbon atoms doubly bonded to a carbon atom of an aliphatic diradical in the 1 and 2 (ortho) or 1 and 4 (para) positions. This ring structure, which is common to each of the quinodimethanes used in the process of this invention, is referred to herein as the quinoid ring. The simplest representative members of this group of compounds are

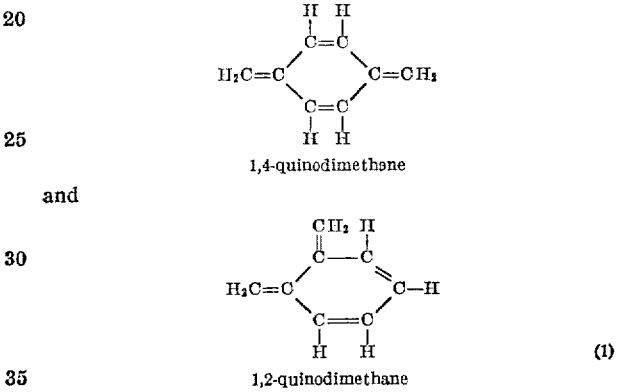

and 1,4-quinodimethane 1,2-quinodimethane (1)

Also included herein under the term quinodimethane are those compounds having the above described quinoid ring fused to one or more aromatic or cycloaliphatic rings. The quinodimethanes which contain a quinoid ring fused to additional rings are preferably those containing only one additional ring which is a six-membered ring having aromatic unsaturation of the benzenoid type and which is fused to the quinoid ring in positions vicinal to the two quinoid ring carbon atoms which are doubly bonded to the aliphatic diradicals as in 1,4-naphthaquinodimethane.

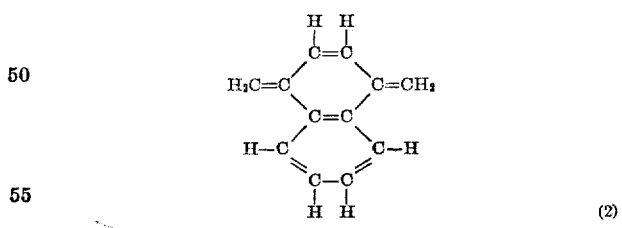

(2)

However, the term quinodimethane also includes those compounds having a six-membered aromatically unsaturated ring fused to the quinoid ring in a position vicinal to only one of the quinoid ring carbon atoms which is doubly bonded to the aliphatic diradicals as in 1,2-naphthaquinodimethane.

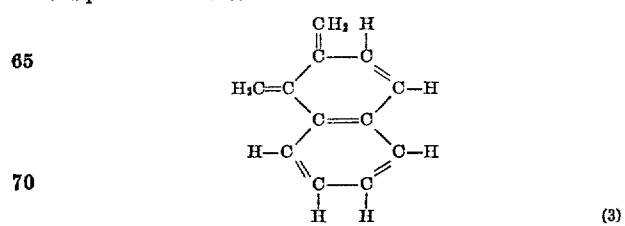

(3)

It is to be understood that the quinodimethanes of this invention may be carbocyclic compounds, i.e., cyclic compounds in which each atom of the basic ring structure is a carbon atom such as in 1,4-quinodimethane and 1,4-naphthaquinodimethane or it may be a nitrogen-containing heterocyclic compound, i.e., a cyclic compound having at least one nitrogen atom as part of the cyclic nucleus. The heterocyclic nitrogen-containing compounds are preferably those in which the nitrogen is vicinal only to carbon and includes those in which nitrogen is a constituent of the quinoid ring or the benzenoid ring. Because the nitrogen atom is assigned the number 1 position on the ring, the position of the two methylene radicals will not be 1 and 4 but will be in a para position with respect to one another in the preferred heterocyclic compounds. Quinodimethanes containing a heterosulfur atom in a five-membered side ring such as in the thiophene analogue of the quinodimethane may also be employed as a monomer without departing from the scope of this invention.

Elements or groups which are bonded to the cyclic skeleton of the quinodimethane are referred to herein as the nuclear substituents and are any of the group consisting of hydrogen, normally gaseous halogens (fluorine and chlorine) and halogenated and non-halogenated methyl radicals ($CH_3$). If the substituents are present in the dicyclic compound they may be on the quinoid ring or on the additional ring or on both rings. When more than one nuclear susbtituent are present, they may be either the same or different substituents, such as both chlorine and fluorine or all chlorine and all fluorine. Of the substituted quinodimethanes which are substituted with methyl, halomethyl and/or halogen radicals, those quinodimethanes having not more than two substituents other than hydrogen are preferred.

Each of the aliphatic diradicals doubly bonded to the quinoid ring of the quinodimethane is a methylene radical. This methylene radical can be substituted or non-substituted without departing from the scope of this invention. When the methylene radical is substituted, not more than two, preferably not more than one of its hydrogen atoms is substituted with a normally gaseous halogen, a phenyl radical, a methyl radical or a halomethyl radical. In the case of double substitution both substituents may be the same or may be any combination of the above.

Most preferred among the quinodimethanes described above are the para-quinodimethanes such as 1,4-quinodimethane, 1,4-naphthaquinodimethane and corresponding heterocyclic quinodimethanes containing no more than two heteronitrogen atoms vicinal to carbon atoms and the nuclear substitution products of the foregoing members with atoms of normally gaseous halogens and methyl radicals, which products contain not more than two nuclearly substituted hydrogen atoms.

It is to be understood that any of the quinodimethanes described above may be homopolymerized to advantage under the conditions described herein to yield moldable homopolymers and any combination of the above quinodimethanes can be interpolymerized to yield a useful and moldable copolymer or terpolymer as the product of the reaction. In the polymerization of a combination of quinodimethanes, any desirable mole ratio may be employed since these compounds are compatible in all proportions. It is to be understood that moldable polymerization products are also produced by effecting copolymerization of a quinodimethane with other comonomers such as inorganic comonomers which include the oxides of sulfur, for example, sulfur dioxide, sulfur monoxide and sulfur trioxide and oxygen and the organic and inorganic phosphorus-containing halides, for example, phosphorus trihalide, phosphorus pentahalide; alkyl phosphorus halide and phosphene. Generally, the phosphorus compounds are copolymerized with quinodimethane in the presence of oxygen. In these copolymerization reactions the comonomer is usually employed in mole ratio amounts of between about 1 to 0.1 and about 1 to 25, preferably between about 1 to 0.5 and about 1 to 15 quinodimethane to comonomer.

The preparation of a quinodimethane which is reacted in accordance with the present invention is effected by the pyrolysis of an aromatic compound such as, for example, 1,4-xylene, 1,4-dimethyl naphthalene, etc., at a temperature between about 700° C. and about 1300° C., and under a total pressure not higher than about 400 mm. mercury for a period not more than one second followed by quenching of the pyrolyzed vapors to a temperature which is below −45° C., in cold liquid or on a cold surface.

The pyrolysis of the aforesaid dimethyl substituted aromatic compound is preferably carried out a temperature within the range between about 900° C. and 1300° C., for example at about 1000° C. For best results the aromatic compound should be present in the vapor phase at a vapor pressure not substantially higher than 150 mm. mercury. Excellent results are obtained when the vapor pressure of the 1,4-dimethyl substituted aromatic compound is 10 mm. mercury or somewhat below, for example, at about 5 mm. mercury. The pyrolysis can be conducted in the presence of an inert gas, such as carbon dioxide, steam or nitrogen particularly when the partial pressure of the aromatic compound is 10 mm. mercury or below. In all cases the total pressure employed should be below 400 mm. mercury. Within the preferred pyrolysis temperature range, the residence time can be varied between about 0.5 and about 0.001 second; however, a shorter or longer residence time can be used without departing from the scope of this invention.

The quinodimethane which forms during pyrolysis is rapidly quenched to a suitable low temperature at which the quinodimethane will not undergo any substantial reaction, such as polymerization. Quenching is achieved by dissolving the pyrolysis product directly from the pyrolysis in a liquid such as, for example hexane, which liquid is maintained at a temperature at or below which the solution is to be reacted, but preferably not higher than −60° C., for example, preferably at a temperature below about −80° C. Even at −90° C. homopolymerization of the monomer occurs although the reaction proceeds at a slow rate. It is, therefore, recommended that the monomer solution so prepared be used as soon as possible. However, when quenching below −150° C. the monomer is substantially unreactive and the solution may be stored for a considerable time before use, i.e., several days.

The liquid used for quenching and storing of the quinodimethane may be of any composition which remains liquid at the necessary temperature range and which has a relatively low partial pressure at about −45° C. consistent with the upper total pressure limit of 400 mm. mercury pressure and preferably low enough to permit operation below 10 mm. mercury. The liquid should also be substantially nonreactive with the quinodimethane formed in the pyrolysis zone, although liquids which do not form compounds which are detrimental to the reaction and do not consume significant amounts of the reactants may be used. Among the specific liquids which may be used are the paraffinic and cycloparaffinic hydrocarbons of low freezing point, such as the hexanes, 3,3-dimethyl pentane, petroleum ether, cyclopentane, cyclohexane and 1,4-dimethyl cyclohexane; the aromatic hydrocarbons of low freezing point such as toluene, ethyl benzene, o-ethyl toluene and m-diethyl benzene; the halogenated hydrocarbons of low freezing point, such as o-chloroethyl benzene, fluorotoluenes and 1,1-dichloroethane; a carbonyl compound of low freezing point such as acetone, methyl ethyl ketone and methyl isobutyl ketone; an ether of low freezing point, such as dimethyl ether, diethyl ether, ethyl n-propyl ether and tetrahydrofuran; an alcohol of low freezing point, such as methanol, ethanol, n-propyl alcohol and isopropyl alcohol; and other normally liquid compounds of low freezing point, such as carbon disulfide. If desired, a liquid of low freezing point may be obtained by the blending of two or more compounds, for example, propane and butane or by the blending of two or more compounds of higher freezing point, for example, a mixture of carbon tetrachloride and chloroform may be used. The concentration of quinodimethane monomer in solution before polymerization is at least 0.01 molar, preferably at least 0.03 molar. To obtain a good yield of moldable polymer the concentration of monomer should be as high as can be obtained in the particular solvent, for example, a 0.15 molar solution is frequently used.

Among the specific carbocyclic aromatic compounds which can be pyrolyzed to produce the aforesaid quinodimethanes which are used as a reactant in accordance with the process of this invention are: p-xylene; pseudocumene; isodurene; prehnitene; pentamethyl benzene; hexamethyl benzene; 1,4-dimethyl naphthalene; 1,2,3,4,6,7-hexamethyl naphthalene; 2-chloro-p-xylene; 2-fluoro-p-xylene; 2,5-difluoro-p-xylene; 2,5-dichloro-p-xylene; 2,3,5-trichloro-p-xylene; 2,3,5-trifluoro-p-xylene; 2,3,5,6-tetrachloro-p-xylene; 2,3,5,6-tetrafluoro-p-xylene; 2-chloro-3,5,6-trimethyl benzene; 6-chloro-1,4-dimethyl naphthalene; 1,2-dimethyl-4-chloromethyl benzene and 2,3,6,7-teterachloro-1,4-dimethyl naphthalene. Among the specific aromatically unsaturated nitrogen-containing heterocyclic compounds which are pyrolyzed to yield the heterocyclic quinodimethanes which are reacted as described herein are: 2,5-dimethyl pyrazine; 2,5-lutidine; 2,5-dimethyl pyrimidine; 5,8-dimethyl quinoline; 1,4-dimethyl isoquinoline; 5,8-dimethyl isoquinoline; 5,8-dimethyl quinazoline; 5,8-dimethyl quinoxaline; 2,3,5-trimethyl pyrazine; 2,3,5,6-tetramethyl pyrazine; 2,3,5-trimethyl pyridine; 2,4,5-trimethyl pyridine; 5,6,8-trimethyl quinoline; and 2,5-dimethyl-6-chloro pyrazine.

A more detailed description including examples concerning the preparation of quinodimethane monomers used in accordance with the present invention can be found in U.S. Patent 2,777,005, granted January 8, 1957.

According to the process of this invention moldable polymers of quinodimethane are produced by conducting the polymerization of a solution of quinodimethane under isothermally controlled conditions at a temperature between about −150° C. and about −45° C.

Heretofore poly-p-xylylene has been produced by polymerizing a quinodimethane solution at a temperature between about −80° C. and about 100° C. by allowing a solution of quinodimethane quenched at a temperature of about −80° C. to warm to room temperature (20° C. ±5° C.) or to warm to a higher temperature. In these cases no temperature control was employed and the polymerization was allowed to occur over a wide temperature range. The moldability of polymers thus produced was not reproducible and varied from batch to batch. With the poly-p-xylylene polymers produced by previous methods it was necessary to resort to high temperatures of molding and, even when molded, the products displayed varying degrees of brittleness. We have now found that the temperature at which the polymerization is allowed to take place is critical in the production of consistently moldable polymer in high yields. The critical temperature lies within the range of between about −150° C. and about −45° C., preferably between about −120° C. and about −55° C. By controlling the polymerization temperature within these limits the rate of reaction is greatly decreased thus producing more moldable polymer. It is to be understood that some degree of polymerization takes place at any temperature above the freezing point of the monomer in solution (p-xylylene in toluene freezes at about −180° C.), however, the rate of reaction is so slow at temperatures below −150° C. that for all practical purposes temperatures below −150° C. are seldom employed.

The rate of reaction is given by the following expression $$\frac{d[M]}{dt} = -kP[M]$$

wherein $k$ is the specific rate constant for propagation; P is the concentration of propagating or growing chains and M is the concentration of the monomer. Although $k$ and P are not known, the product of the two is the apparent rate constant (K) and is given by the following expression $$K = \frac{0.693}{t_{\frac{1}{2}}} = kP$$

wherein $t\frac{1}{2}$ is the time required for one half of the initial amount of monomer to be consumed by the polymerization reaction. The half life is determined by making periodic iodometric titrations of an aliquot sample of the reaction solution. According to the process of the present invention, the rate of reaction (K) should be low preferably a value not above $15.00 \times 10^{-5}$.

While the scope of the present invention should not be limited to any particular theory of operation, it is supposed that the theoretical explanation of what is believed to occur in the mechanism of the reaction will aid in understanding the effect that temperature and rate of polymerization have upon the polymer produced. It is believed that the poly-p-xylylene chain formed in the polymerization reaction is terminated by means of cyclization thus producing the polymeric product composed of a plurality of interlaced rings. When polymerization is conducted at room temperature or at a higher temperature, the rate of reaction is so rapid (at a temperature of about 100° C. polymerization takes place almost instantaneously) that the degree of polymerization of individual poly-p-xylylene chains is small, that is, a multitude of individual short chains are formed. As the temperature increases, new sites of polymerization are introduced to form new short chains. These short chains when terminated cyclize to produce a polymer which contains a multitude of small, tight cross-rings which impart properties similar to those of a highly cross-linked polymer. These small interlaced rings cause the polymer product to be inflexible and therefore not readily moldable. At low temperatures of about −45° C. or preferably below, the rate of reaction is greatly decreased, thereby allowing a higher degree of polymerization of the individual polymer chains. These chains build up to considerable size before termination so that when the polymeric product is obtained, it is composed of large interlaced rings which impart greater flexibility and therefore greater moldability to the polymer.

Before polymerizing the quinodimethane solution of the present invention, and particularly when the quinodimethane solution has been stored for several hours or more, the solution is generally filtered to remove any polymer or solid particles which may be present. The filtration is carried out at a rapid rate so as not to raise the temperature of the monomer solution. As a further precaution against a temperature increase, the apparatus can be cooled to about −80° C. or lower. A preferred filtration technique involves pouring the monomer solution through a solid cake of para-xylene and hexane at the quench temperature of the monomer solution.

The cold filtered solution is then allowed to polymerize slowly at the desired reaction temperature for a period of from about 1 hour to about 1 month or until the desired percent conversion is attained. In some cases at very low temperatures, for example, at about −150° C., the reaction may require more than a month to complete. From a practical standpoint, it may not be desirable to allow the reaction to run over such an extended period of time. Since the reaction is more rapid and relatively more polymer is formed at a faster rate in the beginning of the reaction, as compared with the final stages when the monomer concentration has diminished, it is often desirable to allow the reaction to proceed to a predetermined percent conversion, preferably to at least 85 percent conversion and then terminate the reaction. The terminating step involves initiating cyclization and "killing off" small propagating chains by the addition of a terminating agent such as, for example, oxygen, before allowing the polymeric product to warm to room temperature at a temperature not higher than —45° C. This method of termination is an effective preventive against the formation of short tight rings which occur when a partially converted polymer solution is allowed to warm to room temperature. Since this method has essentially the same effect, regarding the formation of moldable polymer, as allowing the reaction to run to completion at a temperature between about —150° C. and about —45° C., it is frequently employed in polymerizations which require more than one week to complete.

When a terminating agent, such as, for example, oxygen, a halogen, a mercaptan, an oxide of nitrogen or diphenyl picryl hydrazil is employed it is used to saturate the polymer solution. The terminating agent is preferably added at the polymerization temperature of the solution. The small amount of oxidized p-xylene contained in the polymeric product terminated with oxygen is removed, for example, by extraction with hot water or xylene. This step is not essential to the preparation of a moldable product but it is usually necessary before molding at a high temperature under pressure since a high quantity of hydrogen is produced due to the thermal decomposition of the peroxide.

When a terminating agent is employed it is added usually toward the end of the polymerization period. However, in some cases, when very low molding temperatures are required, for example, a molding temperature of about 150° C., the terminating agent such as, for example, oxygen or a mercaptan can be included in the initial polymerization recipe. In the case of oxygen, air may be bubbled through the system throughout the course of the reaction if desired.

The moldable product obtained in accordance with this invention is a solid and can be separated from the reaction mixture by filtration. It is preferable to carry out filtration after the chain termination has been accomplished at the temperature of the polymerization reaction. However, good results are achieved when carrying out the filtration at room temperature after the polymer chains are terminated by a terminating agent or by completing the reaction. Lower molecular weight soluble products can also be obtained by this process; these are recovered by evaporation of the solvent.

The polymer products of the present invention contain a plurality of xylylene units derived from the corresponding quinodimethane monomer. The xylylene unit of the product is obtained by the rearrangement of the quinoid structure of the quinodimethane and contains such substitution as the quinodimethane from which it is derived so that if 1,4-quinodimethane were reacted the resulting xylylene unit of the radical would be

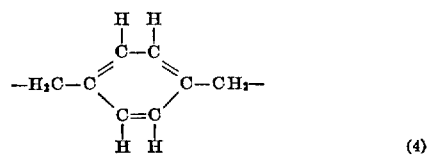

(4)

whereas if 1,4-naphthaquinodiemethane were reacted the xylylene radical would be

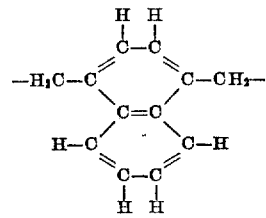

(5)

and if 2-halo-1,4-quinodimethane were used the xylylene radical would be

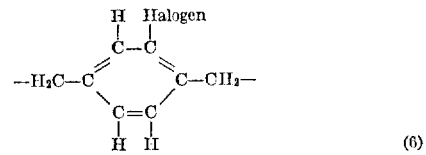

(6)

The polymerization products of the present invention contain a plurality of the following units:

$$(Y_2C-A-CY_2)_m(B)_n$$

wherein the expression $Y_2C-A-CY_2$ is a xylylene unit, Y is a hydrogen or a halogen atom or a phenyl, methyl or halomethyl radical, however, it is to be understood that the two Y units bonded to the carbon atom may be the same or different substituents and that peferably no more than one Y unit of each $CY_2$ group is a substituent other than hydrogen; A is an aromatically unsaturated nucleus of the benzene, naphthalene or heterocyclic nitrogen type which may contain nuclear substituents other than hydrogen, preferably not more than two substituents other than hydrogen selected from the group consisting of fluorine, chlorine, a methyl radical and a halomethyl radical; B in the case of homopolymerization represents the same xylylene unit as $Y_2C-A-CY_2$ in the case of copolymerization B is a dissimilar xylylene unit of the type described above, an oxide of sulfur group, an oxygen molecule or a phosphorus oxyhalide radical depending upon the comonomer from which it is derived; $m$ is an integer between about 2 and about 100,000 and $n$ is an integer between about 1 and about 100.000. The units $$Y_2C-A-CY_2$$

and B can occur in an alternate or a successively recurring manner in the polymer of the product. The preferred polymers of quinodimethane are those which contain a recurring para-xylylene unit derived from the corresponding para-quinodimethane monomer and which contain not more than two dissimilar para-xylylene monomeric units wherein the aliphatic diradicals bonded in the para positions to the aromatic nucleus are unsubstituted methylene radicals. These preferred polymers contain not more than two nuclear substituents other than hydrogen selected from the group consisting of fluorine, chlorine, methyl and halomethyl groups. The following formula illustrates the preferred copolymers $$(H_2C-A-CH_2)_m(H_2C-B-CH_2)_n$$

wherein $m$ is an integer between about 50 and about 100,000, $n$ is an integer between about 1 and about 100,000, A and B are aromatically unsaturated cyclic nuclei of the benzene, naphthalene, or heterocyclic nitrogen type which is singly bonded to methylene groups in the para positions of an aromatic ring and A and B may be similar or dissimilar aromatically unsaturated cyclic nuclei.

The aromatically unsaturated polymer produced by the process of the present invention is molded at a temperatween about 200° C. and about 400° C. under between tween about 2,000 and about 100,000 p.s.i.g., preferably between about 200° C. and about 40° C. under between about 6,000 and about 15,000 p.s.i.g. The polymer samples are subjected to this treatment for a period of between about 1 second and about 60 minutes. The molded samples have good tensile strength and release properties, are non-brittle and have good cohesion properties. The films made therefrom are tough, have good resistance to solvents and sulfuric acid and have excellent electrical properties. Generally, in cases where a terminating agent is added throughout the course of polymerization, the polymeric product can be molded at lower temperatures for example at about 200° C. under about 4,000 p.s.i.g.

The polymeric products of this invention can be molded into a variety of useful articles, such as useful articles of hardware, for example, gauge dials, tool boxes, tool handles; useful household articles, for example, bowls, mixing tools, food molds, moth proofed clothing bags and useful wearing apparel, for example, buttons, buckles and the like.

The polymeric products are also used to coat metal surfaces and render them resistant to moisture and solvent action. Because of the excellent release properties of the polymer, it is also valuable as a coating for trays and molds in tire forming and in the baking industry.

The following examples are offered as a better understanding of the present invention and are not to be construed as unnecessarily limiting thereto.

The following 1,4-quinodimethane monomers in Table I were prepared at −80° C. in toluene to provide solutions having the recorded concentrations. The monomers were allowed to polymerize in a glass flask which, in cases where the polymerization temperature was maintained below room temperature (20° C. ±5° C.), was immersed in a constant temperature bath of Cellosolve. All of the polymeric products were filtered rapidly through crystalline xylene at the temperatures indicated.

In the case of Example 13, the polymerizations were not run to completion but oxygen was added to the polymerization temperature before filtration to terminate the reaction. In this case the oxygenated p-xylylene was removed before molding the polymer, however, polymers containing oxygen not in excess of 1 oxygen atom per 100 p-xylylene units need not be so treated before molding. All other polymerization reactions were run to completion.

All pressings were made on 2.50 gram samples at 400° C. and 8,000 p.s.i.g. except for the sample of Example 14, which was pressed at 350° C. The molded samples were tested for solvent (toluene, chloroform, carbon tetrachloride) and sulfuric acid permeability and were found to be highly resistant.

After 20 hours in the constant temperature bath, both of the solutions were filtered through crystalline xylene at −63° C. and then allowed to warm to room temperature (20° C.±5° C.). Samples of both of the polymeric products were taken and found to be unmoldable. Evidently, upon warming small rings were formed which destroyed the molding properties of the product.

The following polymerizations reported in Table II were examples of the polymerizations of 1,4-quinodimethane in different solvents. The initial concentration of monomer in solutions ranged from about 0.1 to about 0.05 molar. All of these reactions were run to completion. From the results obtained it is evident that the aromatic solvents, for example, toluene are most preferred.

TABLE II

| Example | Grams of p-xylene used | Solvent | Polymerization Temperature, °C. | Color of Polymer | Moldability of Polymer |
|---|---|---|---|---|---|
| 19 | 650 | hexane | −80 to −60 | yellow | good. |
| 20 | 395 | do | −80 to −60 | white | Do. |
| 21 | 300 | methanol | −80 to −60 | light yellow | fair. |
| 22 | 1,056 | hexane+xylene | −80 to −60 | tan | good. |
| 23 | 1,031 | hexane+toluene | −80 to −60 | white | Do. |

The following examples further illustrate the invention.

*Example 24*

A freshly filtered 0.1 normal solution of 1,4-quinodimethane in toluene is prepared at −78° C. This solution is divided into two parts, namely A and B. Solution A is allowed to polymerize in a glass flask over a period of two hours by warming to room temperature. The solid polymer is then removed by filtration, dried

TABLE I

| Example No. | Monomer Concentration, Moles | Polymerization Temperature, ±3° C. | K×10⁻⁵ second⁻¹ | t½ hrs. | Hours in Constant temperature Bath | Filtration Temperature, °C. | Pressing Time in Minutes | Molded Disc | Strength |
|---|---|---|---|---|---|---|---|---|---|
| 1 | 0.0426 | −80 to room temp | | | | 20±5 | 60 | crumbled | poor. |
| 2 | 0.0426 | −80 to −36 | 52.0 | 0.37 | 18 | 20±5 | 60 | do | Do. |
| 3 | 0.0552 | −80 to −42 | 37.4 | 0.51 | 18 | 20±5 | 60 | do | Do. |
| 4 | 0.0552 | −80 to room temp | | | | 20±5 | 60 | do | Do. |
| 5 | 0.0528 | −80 to −43 | | | 18 | 20±5 | 60 | do | Do. |
| 6 | 0.0528 | −80 to room temp | | | | 20±5 | 60 | do | Do. |
| 7 | 0.049 | −80 to −47 | | | 18 | 20±5 | 20 | partially coherent | fair. |
| 8 | 0.052 | −80 to −45 | 47.0 | 0.41 | 25 | −45 | 20 | do | Do. |
| 9 | 0.068 | −80 to −59 | 11.7 | 1.67 | 100 | 20±5 | 20 | coherent | good. |
| 10 | 0.0779 | −80 to −61 | 7.0 | 2.74 | 68 | 20±5 | 20 | do | excellent. |
| 11 | 0.0543 | −80 to −65.5 | 5.68 | 2.04 | 48 | −63 | 20 | do | Do. |
| 12 | 0.058 | −80 to −70 | | | 68 | 20±5 | 60 | do | Do. |
| 13 | 0.085 | −80 to −69.5 | 3.56 | 5.75 | 100 | 20±5 | 20 | do | Do. |
| 14 | 0.0723 | −80 to −70 | 2.09 | 9.25 | 45 | −70 | 20 | do | good. |
| 15 | 0.0670 | −80 to −76.7 | 1.01 | 18.9 | 40 | 20±5 | 20 | partially coherent | excellent. |
| 16 | 0.03 | −78 | 0.62 | | 100 | 20±5 | | easily moldable | |
| 17 | 0.03 | −78 | 0.75 | | 100 | 20±5 | | do | |

*Example 18*

Two solutions of 1,4-quinodimethane (0.067 moles-solution A and 0.0543 moles-solution B) were prepared in toluene at −80° C. Each of the solutions was then allowed to polymerize in a glass flask which was immersed in a constant temperature bath of Cellosolve at −63° C. for the flask containing solution A and at −65.5° C. for the flask containing solution B.

Aliquot samples were taken and titrated with iodine to determine the time required for one half of the initial monomer present to be consumed in the polymerization reaction. For solution A, t½ was 1.47 hours and solution A was allowed to polymerize in the bath for 20 hours until about 90 percent of the initial monomer was consumed; for solution B, t½ was 2.04 hours and solution B was allowed to polymerize in the bath for 20 hours until about 85 percent of the initial monomer was consumed.

and placed in a mold at 400° C. under 8,000 p.s.i.g. The sample is non-moldable and crumbled upon handling.

Solution B is allowed to polymerize in a glass flask which is immersed in a constant temperature bath for four days until completion at −78° C. The solid polymer is removed by filtration at room temperature and molded at 400° C. under 8,000 p.s.i.g. into a tough, coherent disc (3 mm. thick and 25.4 mm. wide). The molded sample is unbroken under normal use and handling.

*Example 25*

A freshly filtered 0.08 normal solution of 1,4-quinodimethane in hexane is prepared at −78° C. This solution is divided into three portions, namely A, B and C. Solution A is allowed to polymerize to completion over a period of eight days at −78° C. The solid polymer is filtered from solution at −78° C. and molded into a tough, coherent disc at 400° C. under 6,000 p.s.i.g.

Solution B is allowed to polymerize until about 90 percent of the initial monomer is consumed in the polymerization reaction (a period of three days) at −78° C. The solution is then warmed to room temperature and the solid polymer is separated by filtration. The polymer so obtained is non-moldable.

Solution C is allowed to polymerize until 90 percent of the initial monomer is consumed in the reaction (a period of three days) at −78° C. The reaction solution is then saturated with oxygen at −78° C. and the solid polymer is removed by filtration at room temperature. The solid polymer is then boiled in water for a period of 24 hours after which it is dried and molded into a tough, coherent disc having good electrical properties and solvent resistance.

*Example 26*

A freshly filtered 0.08 normal solution of 1,4-quinodimethane in toluene is prepared at −78° C. This solution is allowed to polymerize in a glass flask immersed in a constant temperature bath at −63° C. while bubbling nitrogen, which contains 1.25 percent oxygen at a rate of 100 cc. per minute through the reaction mixture for a period of 24 hours until about 85 percent of the initial monomer is consumed in the polymerization reaction. The solid polymer is removed by filtration, boiled in water for a period of 24 hours and molded at 200° C. under 5,000 p.s.i.g. into a coherent disc which had less strength than the polymers produced by the method wherein oxygen is introduced at the end of the reaction.

*Example 27*

A freshly filtered 0.1 normal solution of 1,4-quinodimethane in toluene is prepared at −78° C. This solution is allowed to polymerize in a constant temperature bath at −60° C. until about 88 percent of the initial monomer is consumed in the reaction, after which the solution is saturated with octyl mercaptan at −60° C. The solid polymer is filtered from solution at room temperature and is molded into a tough, coherent disc having good electrical properties and solvent resistance at a temperature of 350° C. under 6,000 p.s.i.g.

*Example 28*

A 0.1 normal solution of 1,4-naphthaquinodimethane in toluene at −78° C. is prepared. This solution is allowed to polymerize in a glass flask which is immersed in a constant temperature bath of Cellosolve maintained at a temperature of −100° C. for a period of 100 hours. Oxygen is then bubbled through the system at a rate of about 10 cc. per minute for 24 hours. The solid polymer is separated by rapidly filtering the solution through crystalline xylene. The solid product is removed from the filter and boiled in water for 24 hours. The solid polymer is then separated and molded at 300° C. under 6,000 p.s.i.g. The resulting molded sample is a tough, coherent disc which has good solvent resistance and electrical properties.

*Example 29*

A 0.08 normal solution of 2-methyl-1,4-quinodimethane in toluene at −78° C. is prepared. This solution is allowed to polymerize in a glass flask which is immersed in a constant temperature bath of Cellosolve maintained at a temperature of −90° C. for a period of 100 hours. Nitrogen dioxide is then bubbled through the system at a rate of about 10 liters per minute for a period of about 1 hour. The solid polymer is separated by rapid refiltering the solution through crystalline xylene. The solid product is removed from the filter and boiled in water for 24 hours, after which the polymer is separated and molded at 300° C. under 8,000 p.s.i.g. The resulting molded sample is a tough, coherent disc which has good solvent resistance and electrical properties.

*Example 30*

A 0.13 normal solution of 5,8-quinolodimethane,

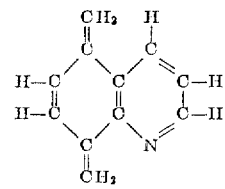

in toluene at −80° C. is prepared. This solution is allowed to polymerize in a glass flask which is immersed in a constant temperature bath of Cellosolve maintained at a temperature of −80° C. for a period of about 200 hours. The solid polymer is separated by rapidly refiltering the solution through crystalline xylene at −80° C. and is then molded into a tough, coherent pellet at 350° C. under 6,000 p.s.i.g.

*Example 31*

A 0.03 normal solution of 1,4-quinodimethane in hexane at −78° C. and a 0.02 normal solution of pseudocumylene in hexane at −78° C. is prepared. The solutions are mixed and allowed to polymerize in a glass flask immersed in a constant temperature bath at a temperature of −78° C. The reaction is continued to completion whereupon the solid product is separated from solution by filtration at room temperature and molded at 250° C. under 8,000 p.s.i.g. for a period of 10 minutes. The molded copolymeric material is a tough, coherent disc having good cohesion and electrical properties and having an excellent solvent resistance.

It is to be understood that any previously described quinodimethane, particularly, a 1,4-quinodimethane can be polymerized or copolymerized in a manner similar to that set forth above in the examples and can be substituted in any of the examples without departing from the scope of this invention.

Having thus described my invention, I claim:

1. A process which comprises polymerizing a paraquinodimethane in solution under isothermally controlled conditions at a temperature of between about −150° C. and about −45° C.

2. A process which comprises dissolving a para-quinodimethane in a solvent and polymerizing said quinodimethane under isothermally controlled conditions at a temperature of between about −150° C. and about −45° C. to yield an aromatically unsaturated moldable polymer.

3. The process of claim 2 wherein the solvent is toluene.

4. The process of claim 2 wherein the solvent is a mixture of hexane and toluene.

5. The process of claim 2 wherein the solvent is a mixture of hexane and xylene.

6. The process of claim 2 wherein the solvent is hexane.

7. The process of claim 2 wherein the solvent is ethyl benzene.

8. The process of claim 2 wherein the quinodimethane is 1,4-quinodimethane.

9. The process of claim 2 wherein the quinodimethane is 1,4-naphthaquinodimethane.

10. The process of claim 2 wherein the quinodimethane is 2-methyl-1,4-quinodimethane.

11. The process of claim 2 wherein the quinodimethone is 3-chloro-1,4-quinodimethane.

12. The process of claim 2 wherein the quinodimethane is a nitrogen-containing heterocyclic quinodimethane.

13. A process which comprises polymerizing a paraquinodimethane dissolved in a solvent under isothermally controlled conditions at a temperature of between about −120° C. and about −55° C. to a predetermined monomer to polymer percent conversion, saturating the reaction solution with a terminating agent at a temperature not higher than −45° C. and filtering an aromatically unsaturated moldable polymer from the reaction solution.

14. The process of claim 13 wherein the terminating agent is oxygen.

15. The process of claim 13 wherein the terminating agent is a mercaptan.

16. The process of claim 13 wherein the terminating agent is an oxide of nitrogen.

17. The process of claim 13 wherein the terminating agent is a halogen.

18. A process which comprises polymerizing a concentrated solution of a para-quinodimethane in a constant temperature bath at a temperature of between about −120° C. and about −55° C. until the reaction is substantially complete; filtering an aromatically unsaturated polymer from the reaction solution and molding the aromatically unsaturated polymer at a temperature of between about 150° C. and about 450° C. under between about 4,000 and about 100,000 p.s.i.g. into a tough coherent article of manufacture.

19. A process which comprises polymerizing a concentrated solution of a para-quinodimethane in a constant temperature bath at a temperature of between about −120° C. and about −55° C. until at least 85 percent of the initial monomer has polymerized; saturating the reaction solution with oxygen at the reaction temperature; filtering an aromatically unsaturated polymer from the reaction; and subsequently molding the polymer at a temperature of between about 150° C. and about 450° C. under between about 4,000 and about 100,000 p.s.i.g.

20. A thermoplastic polymer capable of being shaped into a tough coherent article of manufacture, said polymer obtained by the process of claim 1.

References Cited in the file of this patent

UNITED STATES PATENTS

| | | |
|---|---|---|
| 2,414,028 | Dietrich et al. | Jan. 7, 1947 |
| 2,719,131 | Hall | Sept. 27, 1955 |
| 2,726,217 | Hubbard | Dec. 6, 1955 |
| 2,777,005 | Errede et al. | Jan. 8, 1957 |

FOREIGN PATENTS

| | | |
|---|---|---|
| 647,111 | Great Britain | Dec. 6, 1950 |
| 650,947 | Great Britain | Mar. 7, 1951 |
| 673,651 | Great Britain | June 11, 1952 |
| 673,652 | Great Britain | June 11, 1952 |

OTHER REFERENCES

Kharasch et al.: Ind. and Eng. Chem., vol. 39, pp. 830–7, July 1947.

Schildknecht: "Vinyl and Related Polymers," John Wiley & Sons, New York, 1952, p. 26.

Farthing: J. Chem. Soc., October 1953, pp. 3261–3277.

Whitby: "Synthetic Rubber," pages 252–7, Wiley, New York (1954).

Kaufman et al.: Jour. Poly. Science, vol. 13, pages 3–20, 1954.

UNITED STATES PATENT OFFICE
CERTIFICATE OF CORRECTION

Patent No. 3,084,146                                  April 2, 1963

Louis A. Errede

It is hereby certified that error appears in the above numbered patent requiring correction and that the said Letters Patent should read as corrected below.

Column 8, line 59, for "400° C." read -- 450° C. --; column 8, line 60, strike out "tween about 200° C." and insert instead -- ture between about 150° C. --; line 62, for "40° C." read -- 400° C. --.

Signed and sealed this 21st day of April 1964.

(SEAL)
Attest:

ERNEST W. SWIDER
Attesting Officer

EDWARD J. BRENNER
Commissioner of Patents